(No Model.)　　　　　　　　　　　　　　　　　　2 Sheets—Sheet 1.
G. FRY.
CORN PLANTER.
No. 441,795.　　　　　　　　　　Patented Dec. 2, 1890.
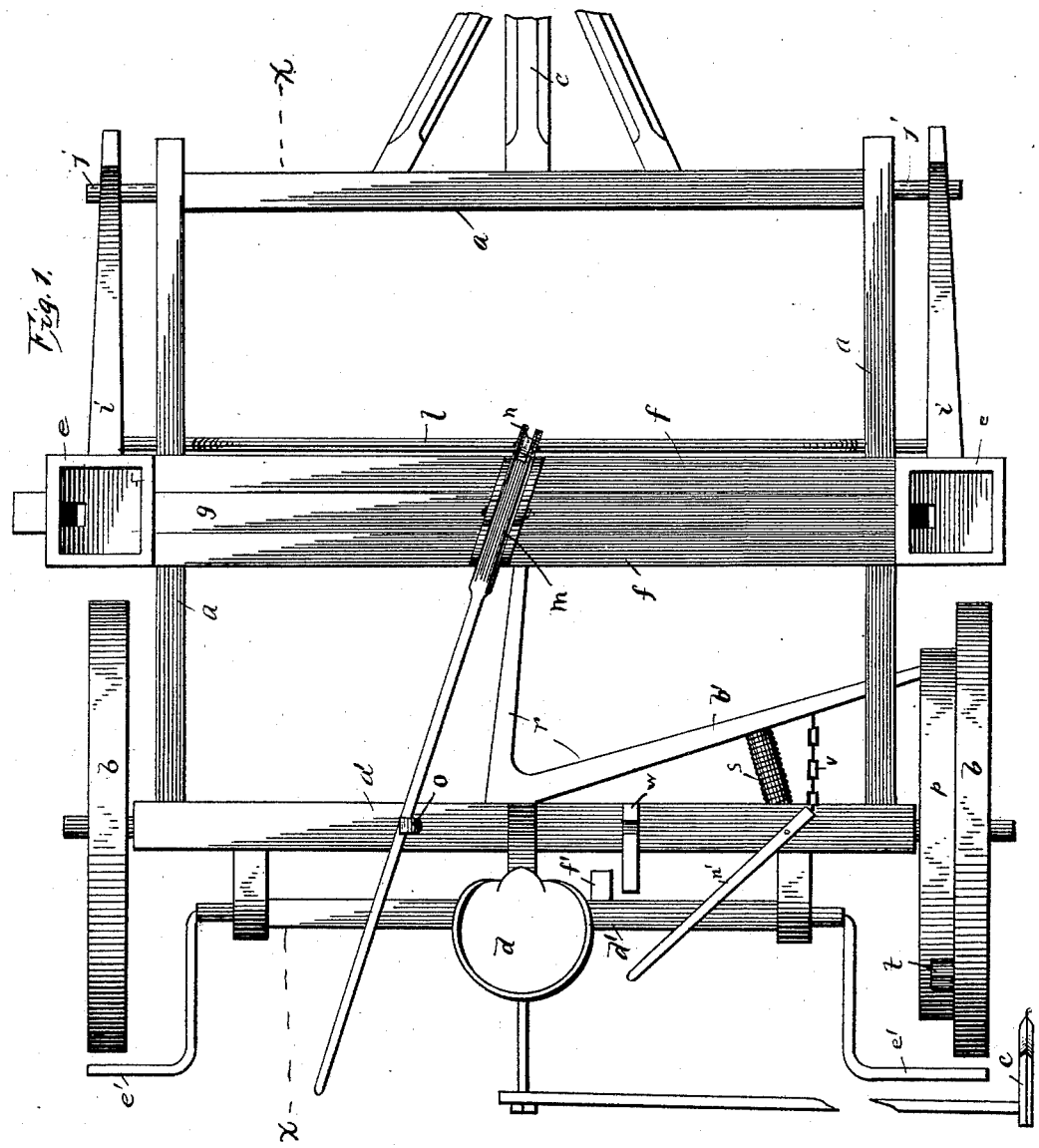
WITNESSES:
INVENTOR
Greenwood Fry
BY O. E. Duffy
ATTORNEY.

(No Model.) 2 Sheets—Sheet 2.
G. FRY.
CORN PLANTER.
No. 441,795. Patented Dec. 2, 1890.
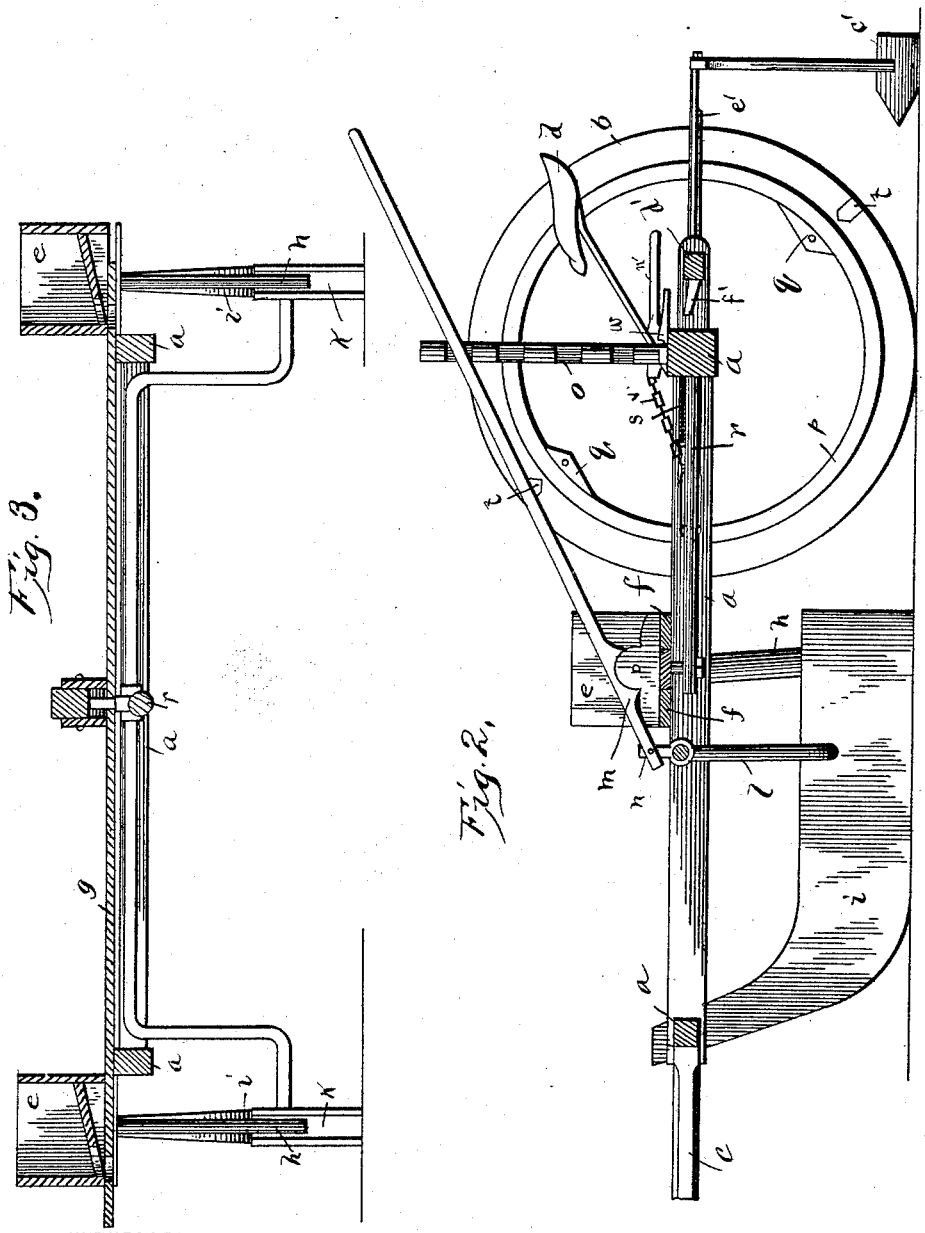
WITNESSES:
INVENTOR
ATTORNEY.

UNITED STATES PATENT OFFICE.

GREENWOOD FRY, OF COTTAGEVILLE, KENTUCKY, ASSIGNOR OF ONE-HALF TO HUMPHREY M. CRAWFORD, OF LOS ANGELES, CALIFORNIA.

CORN-PLANTER.

SPECIFICATION forming part of Letters Patent No. 441,795, dated December 2, 1890.

Application filed February 25, 1890. Serial No. 341,681. (No model.)

*To all whom it may concern:*

Be it known that I, GREENWOOD FRY, of Cottageville, in the county of Lewis and State of Kentucky, have invented certain new and useful Improvements in Corn-Planters; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to certain improvements in corn-planters; and the invention consists in certain novel features of construction and in combinations of parts more fully described hereinafter, and particularly set forth in the claim.

Referring to the accompanying drawings, Figure 1 is a plan view of the machine. Fig. 2 is a longitudinal vertical section. Fig. 3 is a cross-section.

In the drawings, the reference-letter $a$ indicates a suitable rectangular frame, consisting of side and end beams and supported at the rear by the two wheels $b\ b$.

At the front the frame is provided with a draft-tongue $c$ and at the rear with a suitable seat $d$ for the driver. $e\ e$ indicate the usual seed-boxes, located on opposite sides of the frame and supported by the two cross-beams $f f$. These boxes have seed-discharge openings in their bottoms controlled by the reciprocating slide $g$, as usual, and as shown, the slide having apertures to register with said discharge-apertures of the boxes when the slide is at its limit of movement in one direction, and to close said apertures when at its limit of movement in the opposite direction, said slide reciprocating between beams $f f$. A discharge-tube $h$ extends down from the seed-opening of each seed-box to convey the seed to and discharge it into the furrow.

The furrow-opening runners $i\ i$ at their upper front ends are pivoted to swing vertically, or are rigidly secured to a transverse horizontal rocking shaft or beam $j$, mounted in the frame. This beam is preferably the same one to which the draft-tongue is secured. The rear ends of the runners are bifurcated, as shown at $k$, and the discharge-tubes $h$ extend down through and between the legs of said ends, so that the earth will pass around the ends of the runners and fall into the furrow and partially cover the seed therein.

A vertical yoke or rod $l$ is at its ends secured rigidly to the rear ends of the runners, and at its central portion is bent up and loosely secured to the lower end of a vertically-moving operating-lever $m$ by means of a loose link $n$. This lever is fulcrumed to a suitable support on the beams $f f$, and at its handle end extends rearwardly to within easy reach of the driver's seat. When it is desired to move the machine without operating it, the driver presses down the handle end of the lever $m$ and catches it under a lower hook or lug of the vertical rack-bar $o$, thereby drawing up the yoke $l$ and raising the runners from the ground. The runners are thrown into engagement with the ground by releasing the handle end of said lever.

One of the main wheels is provided with annular concentric inwardly-extending flange $p$, the inner surface of which is provided with one or more rearwardly-projecting double-in-inclined lugs $q$. A horizontally-swinging double-armed angular lever $r$ is pivoted at its elbow to the rear cross-beam $a'$ of the frame. The forwardly-extending arm of this lever is pivoted at the end to the seed-dropping slide $g$ to reciprocate the same to close and open the seed-boxes. The other and inclined arm $b'$ of the lever extends toward the wheel, with its ends projecting within said flange $p$ and through a slot in the side beam of the frame, which slot limits the swing of said lever. A coil or other spring $s$ is secured to the arm $b'$ to constantly force the end of the same toward the flange $p$, so that as the wheel revolves the end of said arm will be engaged and forced back by the inclined lug $q$, thereby rocking said lever and reciprocating the slide and dropping two hills of corn at each reciprocation, the slide being returned to its normal position by said spring. As many lugs $q$ can be located on the flange $p$ as desired and according as to whether the hills are to be far apart or near together. The outer periphery of said flange or the wheel itself opposite each lug $q$ is provided with a projection $t$ to enter the ground and mark opposite the place where each hill is dropped, so that the hills can be located after being planted.

In order to throw the operating-lever out of engagement with the lugs $q$, so that the machine can be moved without operating the slide, a horizontally-swinging lever $n'$ is pivoted to the rear cross-beam of the frame, with one end connected by connections $v$ with the arm $b'$ of the lever, and its handle end within convenient reach from the driver's seat, so that when the handle end of the lever is thrown forwardly and caught on the catch $w$ to hold it the opposite end of the lever draws the arm $b'$ rearwardly against the tension of the springs $s$ and out of the path in which the lugs $q$ travel; hence the wheel can revolve without rocking said lever.

$C'$ indicates a reversible marker, which can be swung from one side of the machine to the other. A transverse rock-shaft $d'$ is journaled at the rear end of the frame and carries scrapes $e'$ at its ends to be thrown into or out of engagement with the wheels by rocking said shaft, and the shaft can be provided with a lateral foot-piece $f'$, by which it can be rocked by the driver while in his seat.

What I claim is—

In a corn-planter, the combination of the frame, the main wheels, one of said wheels having an annular flange on its inner side provided with one or more inwardly-projecting lugs, the seed-boxes and slide, and the two-armed lever fulcrumed at its elbow to the main frame to rock horizontally, having one arm pivoted to said slide to reciprocate the same, the other arm projecting within said flange, and the expansive spring interposed between said last-mentioned arm and the main frame, and the holding-lever to draw back and hold said lever out of operative position, substantially as described.

In testimony that I claim the foregoing as my own I affix my signature in presence of two witnesses.

GREENWOOD FRY.

Witnesses:
O. E. DUFFY,
C. M. WERLE.